(12) United States Patent
Zingerle et al.

(10) Patent No.: US 11,674,577 B2
(45) Date of Patent: Jun. 13, 2023

(54) DIFFERENTIAL ARRANGEMENT

(71) Applicant: GKN Automotive Limited, Birmingham (GB)

(72) Inventors: Matthias Zingerle, Toblach (IT); Nikolaus Mayr, Bruneck (IT); Sigmund Senoner, Pfalzen (IT); Hanspeter Putzer, Gais (IT)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/551,245

(22) Filed: Dec. 15, 2021

(65) Prior Publication Data
US 2022/0194223 A1 Jun. 23, 2022

(30) Foreign Application Priority Data
Dec. 21, 2020 (EP) .................................... 20215928

(51) Int. Cl.
 *F16H 48/08* (2006.01)
 *F16H 48/24* (2006.01)
 *F16H 48/40* (2012.01)
 *F16H 48/34* (2012.01)

(52) U.S. Cl.
 CPC ............. *F16H 48/08* (2013.01); *F16H 48/24* (2013.01); *F16H 48/40* (2013.01); *F16H 2048/346* (2013.01)

(58) Field of Classification Search
 CPC ............................ F16H 48/24; F16H 2048/346
 See application file for complete search history.

(56) References Cited

U.S. PATENT DOCUMENTS 3,105,394 A * 10/1963 Salzmann ............... F16H 48/08
  475/263
6,015,361 A * 1/2000 Yamazaki ............... F16H 48/11
  192/69.82
9,476,460 B2 * 10/2016 Seidl ....................... F16D 13/46
(Continued)

FOREIGN PATENT DOCUMENTS

CH    178723 A  *  7/1935
DE  197 16 386 A1    11/1997
(Continued)

OTHER PUBLICATIONS

Catalog) NSK. Rolling Bearings. www.NSK.com [online]. 2013 [retrieved on Oct. 15, 2022]. Retrieved from https://www.nsk.com/common/data/ctrgPdf/bearings/e1102m.pdf.*

*Primary Examiner* — Ernesto A Suarez
*Assistant Examiner* — James J Taylor, II
(74) *Attorney, Agent, or Firm* — Bejin Bieneman PLC (57) ABSTRACT

Differential arrangement, e.g., for a drive axle of a motor vehicle. The differential arrangement comprises a drive wheel; a differential gear having an input part; a shift clutch operatively arranged between the drive wheel and the differential gear, wherein in the closed state of the shift clutch torque is transmitted from the drive wheel to the differential gear and in the open state of the shift clutch a torque transmission is interrupted. A first clutch part of the shift clutch is fixedly connected to the input part or to a differential housing of the differential gear, and a second clutch part of the shift clutch is fixedly connected to the respective other one of the input part and the differential housing.

20 Claims, 10 Drawing Sheets

(56) References Cited

U.S. PATENT DOCUMENTS

| | | | |
|---|---|---|---|
| 10,012,300 B2* | 7/2018 | Valente | F16H 48/24 |
| 10,670,129 B2* | 6/2020 | Downs | F16H 48/24 |
| 11,231,098 B2* | 1/2022 | Swinger | F16H 48/26 |
| 2010/0113208 A1 | 5/2010 | Haugeberg | |
| 2018/0099562 A1 | 4/2018 | Yoshisaka et al. | |

FOREIGN PATENT DOCUMENTS

| | | |
|---|---|---|
| DE | 10 2009 056 088 A1 | 9/2011 |
| DE | 10 2013 111 891 A1 | 4/2015 |

* cited by examiner

DIFFERENTIAL ARRANGEMENT

CROSS-REFERENCE TO RELATED APPLICATIONS

This application claims priority to European Patent Application No. EP 20215928.1, filed on Dec. 21, 2020, which application is hereby incorporated herein by reference in its entirety.

BACKGROUND

A differential arrangement is known from DE 10 2009 056 088 A1. The differential arrangement comprises a driving wheel; a differential gear having an input part and two output parts, the output parts being drivingly connected to the input part and having a compensating effect between them. A shift clutch is operatively disposed between the driving wheel and the differential gear, wherein when the shift clutch is closed, torque is transmitted from the driving wheel to the differential gear, and when the shift clutch is open, the torque transmission is interrupted. A controllable actuator is provided for actuating the shift clutch, and a sensor is provided for detecting at least three shift positions of the shift clutch.

A drive arrangement, in particular for use in the drivetrain of a motor vehicle, is known from DE 10 2013 111 891 A1. The drive arrangement comprises a rotatably drivable housing, an output part and a clutch which is arranged between the rotatably drivable housing and the output part, the clutch having a first clutch part which is held in a rotationally fixed and axially movable manner relative to the housing, and a second clutch part which is fixedly connected to the output part and is arranged inside the rotatably drivable housing. A controllable actuator is provided for actuating the clutch. An indicator element is axially movable when the clutch is actuated, and a sensor detects switching positions of the clutch. The first clutch member has a ring portion disposed outside the housing, and a plurality of cam elements extending axially from the ring portion into the interior of the housing through openings in the housing.

An axially movable clutch part, which is either arranged inside the differential housing and is actuated via elements extending axially through openings from the interior of the differential housing, or which is arranged at least partially outside the differential housing and is connected in a torque-transmitting manner to a further clutch part via elements extending axially through openings into the interior of the differential housing, is exposed to a high mechanical load and is therefore can be complex in design and expensive in production.

SUMMARY

The present disclosure relates to a differential arrangement, in particular for a drive axle of a motor vehicle. The differential arrangement comprises a drive wheel, a differential gear having an input part and a shift clutch operatively arranged between the drive wheel and the differential gear, wherein in the closed state of the shift clutch torque is transmitted from the drive wheel to the differential gear and in the open state of the shift clutch a torque transmission is disconnected. A first clutch part of the shift clutch is fixedly connected to the input part or to a differential housing of the differential gear, and a second clutch part of the shift clutch is fixedly connected to the respective other one of the input part and the differential housing.

According to an aspect, a differential arrangement, in particular for a drive axle of a motor vehicle, comprises a drive wheel, a differential gear with an input part and a shift clutch operatively arranged between the drive wheel and the differential gear, wherein in the closed state of the shift clutch torque is transmitted from the drive wheel to the differential gear and in the open state of the shift clutch a torque transmission is interrupted, wherein a first clutch part of the shift clutch is fixedly connected to a differential housing of the differential gear and a second clutch part of the shift clutch is fixedly connected to the input part. The shift coupling comprises coupling members displaceable relative to the first clutch part and to the second clutch part and at least one switching element acting on the coupling members, the switching element switching the coupling members between a first position for the closed state of the shift coupling, in which the coupling members are arranged in a torque-transmitting manner between the first clutch part and the second clutch part, and a second position for the open state of the clutch, in which the first clutch part is disconnected from the second clutch part, at least six coupling members being provided.

By input part of the differential gear, for example, a differential carrier, which is also called a differential cage, is designated. Output parts of the differential arrangement may be side shaft gears if a bevel gear differential or crown gear differential is used, or an internal gear or sun gear if a planetary gear differential is used. The shift clutch is particularly realized as a positive-locking clutch.

An advantage of the differential arrangement is that, due to the coupling members being displaceable relative to the first clutch part and to the second clutch part, the torque-transmitting connection can be established and separated without making one of the clutch parts movable. As a result, at least one of the clutch parts can be designed in a more straightforward way. In particular, none of the clutch parts needs to be actuated by an actuator. The at least six coupling members provided in the shift clutch have the advantage that the torque transmission is distributed among the coupling members, so that each individual coupling member can be manufactured less expensively with respect to its strength. For example, the coupling members may be evenly distributed around the circumference of the shift clutch. The torque load is then advantageously distributed evenly over all the coupling members. The use of a larger number of small coupling members allows a saving in installation space required for the shift clutch. Higher torques can advantageously be transmitted via a higher number of coupling elements. The shift clutch is thus advantageously scalable. In particular, at least 8 coupling members can be provided. Up to 20 coupling elements are conceivable, or even more in the case of correspondingly larger differential arrangements.

The torque is transmitted directly from the first clutch part to the coupling elements or vice versa. Similarly, the torque is transmitted directly from the second clutch part to the coupling members or vice versa. According to an embodiment, it is provided that the coupling members are guided in openings of the first clutch part or of the second clutch part, wherein in the closed state of the shift clutch the switching element in the first position actuates the coupling members to protrude from the openings so that the coupling members engage in recesses of the respective other one of the first clutch part and the second clutch part. In the open state of the shift clutch, the switching element in the second position causes the coupling members to recoil from the recesses into the openings. The coupling members protrude from the openings by projecting beyond an outer contour of the respective clutch part in at least one direction, without being positioned completely outside the clutch part. The coupling member is considered to have recoiled into the openings if it does not protrude beyond the contour of the clutch part in at least the same direction.

For example, the switching element is coaxially arranged with the first clutch part and is axially displaceable between the first position and the second position. An actuator, in particular a controllable actuator, may be provided for actuating the shift clutch, the actuator advantageously acting on the switching element and moving the switching element from the second position to the first position. The actuator may optionally also move the switching element from the first position to the second position, where alternatively the switching element may be biased towards the second position by means of a spring. Advantageously, the actuator acts on the switching element which does not participate in the torque transmission between the clutch parts. Thus, the switching element as a movable part can be of simple design, since it is subjected to comparatively low mechanical stress. In all embodiments, axial, coaxial and radial refer to spatial directions or orientations of components in relation to an axis of rotation of the differential gear about which, for example, the drive gear, the input part and the side shaft gears rotate, unless another axis is expressly specified as a reference.

According to an embodiment, it is provided that the coupling members are formed as balls or as cylindrical pins. A diameter of the balls or the cylindrical pins may be between five and fifteen millimeter, in particular between eight and twelve millimeter. The torque is transmitted directly from the first coupling member to the spherical or cylindrical surface of the coupling members, or vice versa. Similarly, the torque is transmitted directly from the second clutch part to the spherical or cylindrical surface of the coupling members or vice versa. A cylindrical pin is to be understood as a pin of substantially cylindrical shape, which may optionally comprise grooves or similar recesses in the longitudinal or circumferential direction.

According to a further embodiment, it is provided that the coupling members are guided axially displaceably in axial openings of the first clutch part. The axial openings of the first clutch part are configured, for example, as continuous axial bores in the differential housing. The switching element can thus have a ring section acting on the coupling members from outside the differential housing.

According to a further embodiment, it is provided that the coupling members are designed as cylindrical pins and are guided axially displaceably in the axial openings of the first clutch part. The cylindrical pins as coupling members may be fixedly connected to the switching element. For example, the coupling members are positively connected to the switching element in the axial direction. Advantageously, the switching element can serve as an indicator element for a sensor for determining switching positions of the shift clutch.

The cylindrical pins as coupling members may have conical head regions at their end facing the second clutch part, the head regions tapering in the axial direction from the second clutch part towards the first clutch part. Further, the recesses of the second clutch part may widen in axial direction from a surface facing the first clutch part into the second clutch part. The tapered head portions and/or the widening recesses are advantageously adapted to retain the coupling members in the recesses by sufficient frictional force between the tapered head portions and walls of the recesses to prevent inadvertent disconnection of the clutch, particularly when little or no torque is transmitted between the first clutch part and the second clutch part via the coupling members.

According to a further embodiment, it is provided that the recesses of the second clutch part are designed as elongated holes, the largest extension of which are arranged in the circumferential direction, so that an displacement of the cylindrical coupling members into the first position is facilitated. A number of the recesses of the second clutch part may be larger than the number of coupling members, for example by an integer multiple of the number of coupling members.

According to a further embodiment, it is provided that the at least one switching element comprises pins engaging in the axial openings, wherein the coupling members are configured as balls. In the closed state of the shift clutch, the coupling members are held by the pins in the recesses of the second clutch part. Guide sleeves can be arranged in the axial openings for guiding the coupling members.

According to a further embodiment, it is provided that the coupling members are radially displaceably guided in radial openings of the second clutch part. The at least one switching element comprises a switching contour acting on the coupling members in order to displace the coupling members. The switching contour causes the coupling members to recoil into the radial openings of the second clutch part in the second position, and displaces them partially out of the radial openings in the first position.

The radial openings of the second clutch part can be designed as continuous radial bores in the input part. In the closed state of the shift clutch, the coupling members are radially locked by the at least one switching element. This is achieved particularly advantageously if the switching element is arranged radially between the second clutch part and the differential housing. In this respect, the at least one switching element may comprise a sleeve-shaped section with the switching contour. Alternatively, the switching element may also have pins arranged annularly, each pin acting on one coupling member.

The at least one switching element comprises, for example, at least one projection extending axially through an opening of the differential housing, wherein the switching element can be actuated by the actuator via the at least one projection. The at least one projection may further be connected, for example, to an indicator element for a sensor for determining switching positions of the shift clutch.

BRIEF DESCRIPTION OF THE DRAWINGS

Exemplary embodiments are illustrated below with reference to the drawings.

DETAILED DESCRIPTION

Figure 1:
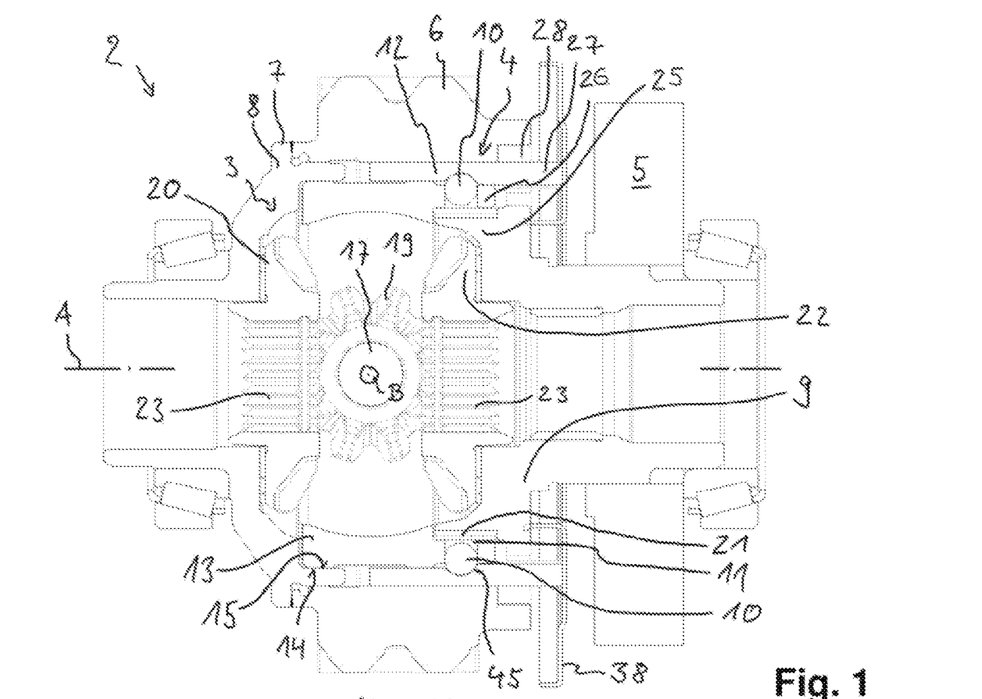
FIG. 1 shows a differential arrangement with shift clutch according to an embodiment in longitudinal section with the shift clutch in the open position.
Figure 2:
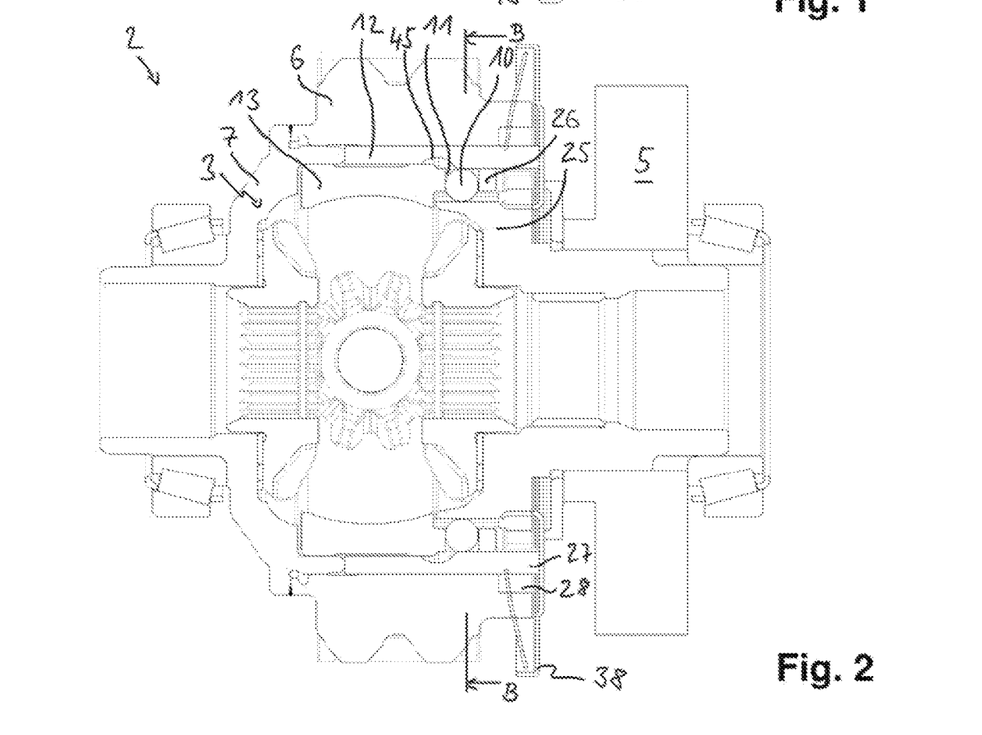
FIG. 2 shows the differential arrangement according to FIG. 1 with the shift clutch in the closed position.
Figure 3:
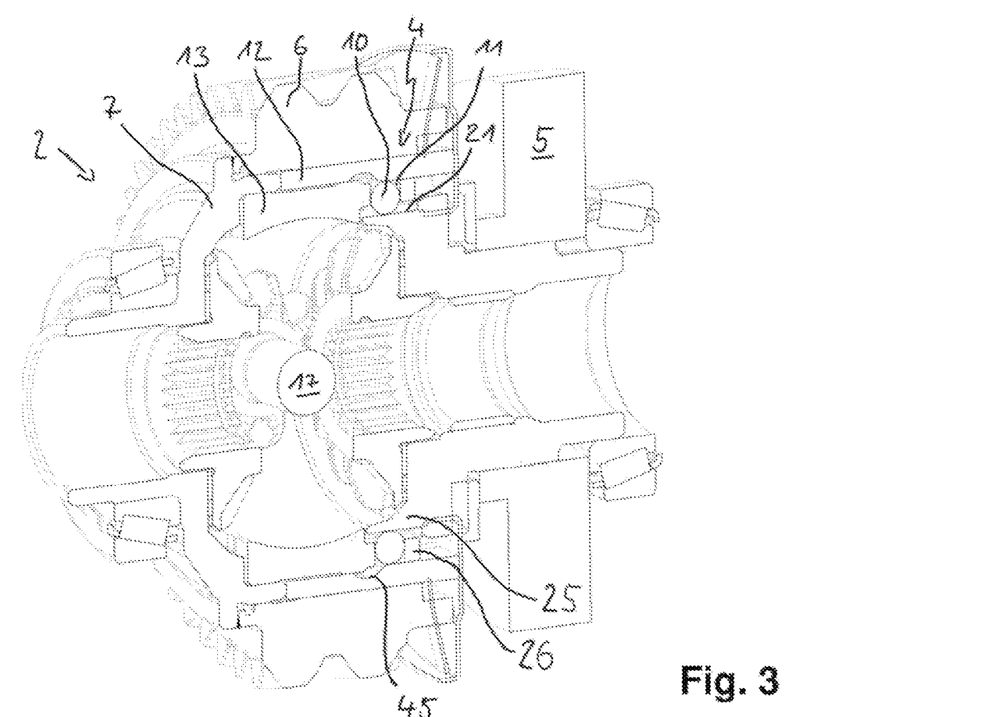
FIG. 3 is a perspective view of the differential arrangement according to FIG. 2.
Figure 4:
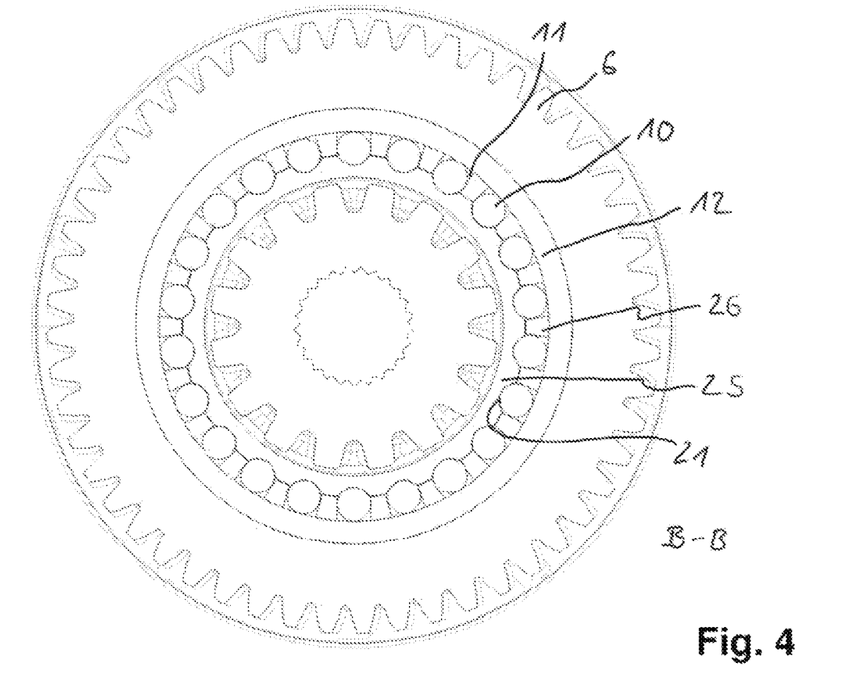
FIG. 4 shows the differential arrangement according to FIG. 2 in cross-section.

FIGS. 1 to 4 are described together below and show a differential arrangement 2 according to an embodiment for a drive axle in a drive arrangement of a motor vehicle according to FIG. 21 in a first embodiment. FIG. 1 shows the differential arrangement 2 with a shift clutch 4 in the open position of the shift clutch 4 in a longitudinal section. FIG. 2 shows the longitudinal section of the differential arrangement in closed shift position of the shift clutch 4. FIG. 3 shows the differential arrangement in perspective view and FIG. 4 shows a cross-section along the line B-B in FIG. 1. A differential arrangement 2 is shown which comprises a differential gear 3, a shift clutch 4 and an actuator 5 for actuating the shift clutch 4. For transmitting a torque from a drive motor not shown here, a drive wheel 6 is provided, which is fixedly connected to a differential housing 7. The differential housing 7 is of two-part construction and comprises a first cup-shaped housing part 8 and a second cup-shaped housing part 9, the second housing part 9 being formed integrally with the drive wheel 6. The first housing part 8 is firmly connected to the second housing part 9, in particular by means of welding. It will be understood that the connection between the drive wheel 6 and the differential housing 7, or between the first housing part 8 and the second housing part 9, can also be effected by other means, for example by screw connections or other conventional connecting means. The differential gear 3 is arranged in the differential housing 7, and can be driven in rotation about an axis of rotation A.

The differential gear 3 comprises a differential carrier 13 having a substantially cylindrical outer surface 14, with which the differential carrier 13 is slidably mounted for rotation about the axis of rotation A relative to a corresponding inner cylindrical surface portion 15 of the first housing part 8. Two bores are provided in the differential carrier 13, into which a journal 17 is inserted. Two differential pinions 19 are rotatably mounted on the journal 17 about a journal axis B. The two differential pinions 19 are in meshing engagement with a first and a second sideshaft gear 20, 22, which are arranged coaxially with respect to the axis of rotation A. The two sideshaft gears 20, 22 each have a longitudinal toothing 23 into which a corresponding mating toothing of a sideshaft (FIG. 21) can be inserted for torque transmission. The first side shaft gear 20 is axially supported relative to the first housing part 8, wherein a sliding disc is preferably arranged between the first side shaft gear 20 and the support surface of the first housing part 8. Correspondingly, a sliding disc is also arranged between the second side shaft wheel 22 and the second housing part 9 for supporting the axial forces.

In the present case, the shift clutch 4 is in the form of a positive-locking clutch. The positive-locking clutch 4 comprises a first clutch part 25, which is fixedly connected to the differential housing 7, and a second clutch part 26, which is fixedly connected to the input part 13, as well as ten coupling members 10, which are displaceable relative to the first clutch part 25 and to the second clutch part 26, and a switching element 12 acting on the ten coupling members 10. In the closed state of the shift coupling 4, a torque is transmitted between the first clutch part 25 and the second clutch part 26 via the coupling members 10, whereas in the open state of the shift coupling 4 the coupling members 10 do not transmit any torque. In FIG. 1 the shift clutch 4 is shown in closed condition. The switching element 12 is in a first position, in which it holds the coupling members 10 in a torque-transmitting manner between the first clutch part 25 and the second clutch part 26. In FIG. 2, the shifting clutch 4 is shown in an open state. The switching element 12 is in a second position in which it releases the coupling members 10, so that the first clutch part 25 is disconnected from the second clutch part 26 and torque transmission is interrupted. The coupling members 10 are guided in openings 11, either of the first clutch part 25 or of the second clutch part 26, wherein in the closed state of the shift clutch 4 the switching element 12 in its second position actuates the coupling members 10 to emerge from the openings 11 so that the coupling members 10 engage in recesses 21 of the respective other one of the first clutch part 25 and the second clutch part 26. In the open state of the shift clutch 4, the switching element 12 in its second position releases the coupling members to recoil from the recesses 21 into the openings 11. The switching element 12 is coaxially arranged with the first clutch part 25 and is displaceable in the axial direction between the first position and the second position. A controllable actuator 5 is provided for actuating the shift clutch 4 by moving the switching element 12 from the second position to the first position.

In the exemplary embodiment according to FIGS. 1 to 4, the ten coupling members 10 are configured as balls radially slidably guided in radial openings 11 of the second clutch part 26. The switching element 12 has a switching contour 45 acting on the coupling members 10. The switching contour 45 here is a receptacle into which the spherical coupling members 10 can recoil. If the switching element 12 is axially displaced from the second position into the first position, the switching contour 45, in the manner of a linear cam, pushes the coupling members 10 out of the openings 11, which are configured as continuous radial bores in the input part 13, to protrude out of the outer contour of the second clutch part 26. In the closed state of the shift clutch 4, the coupling members 10 are radially locked by the at least one switching element 12, which is radially arranged between the second clutch part 26 and the differential housing 7.

The switching element 12 has at least one projection 27 extending axially through an opening 28 of the differential housing 7, so that the switching element 12 can be actuated by the actuator 5 via the at least one projection 27. The at least one projection 27 is further connected to an indicator element 38 for a sensor (44, FIG. 21) for determining shift positions of the shift clutch 4. A return spring 43 is arranged between the differential housing 7 and the indicator element 38. In the present case, the return spring 43 is in the form of a disc spring, although it is understood that other forms of springs, for example helical springs, may also be used. The switching element 12 may comprise a sleeve-shaped portion having the switching contour 45, the one or more projections 27 extending axially from the sleeve-shaped portion. Alternatively, the switching contour 45 may be attached to coaxially annularly arranged axial pins, one pin being associated to each coupling member 10.

The sensor 44 (FIG. 21) is arranged axially in the area of the actuator 5 and cooperates with the indicator element 38. The sensor 44 can be in the form of a Hall sensor which can detect the distance to the indicator element 38 without contact. However, another non-contact sensor may also be used, for example an inductive sensor. In the open position of the shift clutch 4, the indicator element 38 is axially proximal to the sensor 44. This position, in which the shift clutch 4 is open, is shown in FIG. 1. In contrast, in FIG. 2 a shifting state is shown in which the shift clutch 4 is in an engaged state for transmitting torque from the drive wheel 6 to the differential carrier 13. It can be seen that the indicator element 38 is moved relative to the sensor 44 together with the switching element 12 in the direction towards the first clutch part 25 or towards the differential gear 3.

Figure 5:
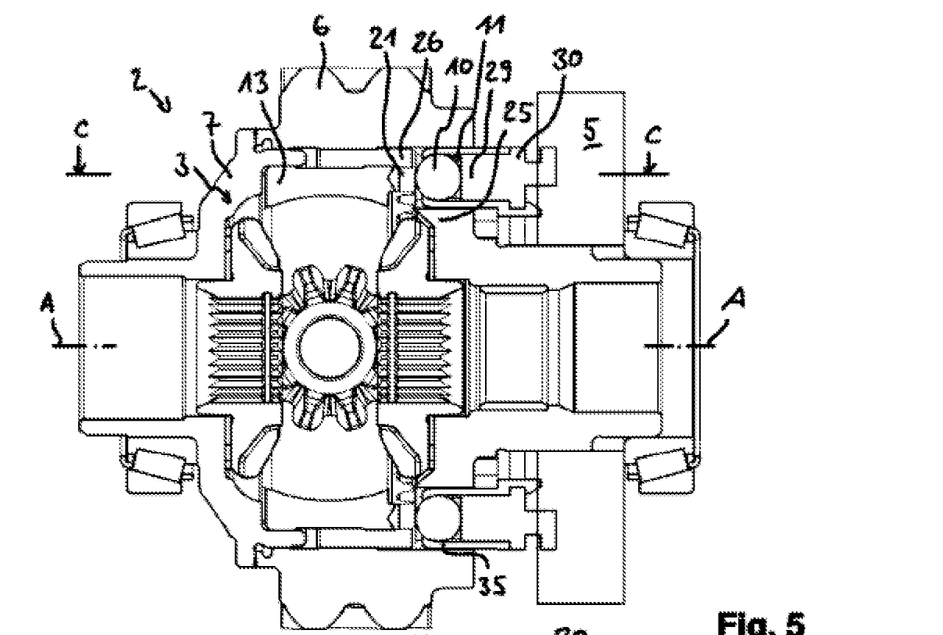
FIG. 5 shows a differential arrangement with shift clutch in a further embodiment in longitudinal section with the shift clutch in the open position.
Figure 6:
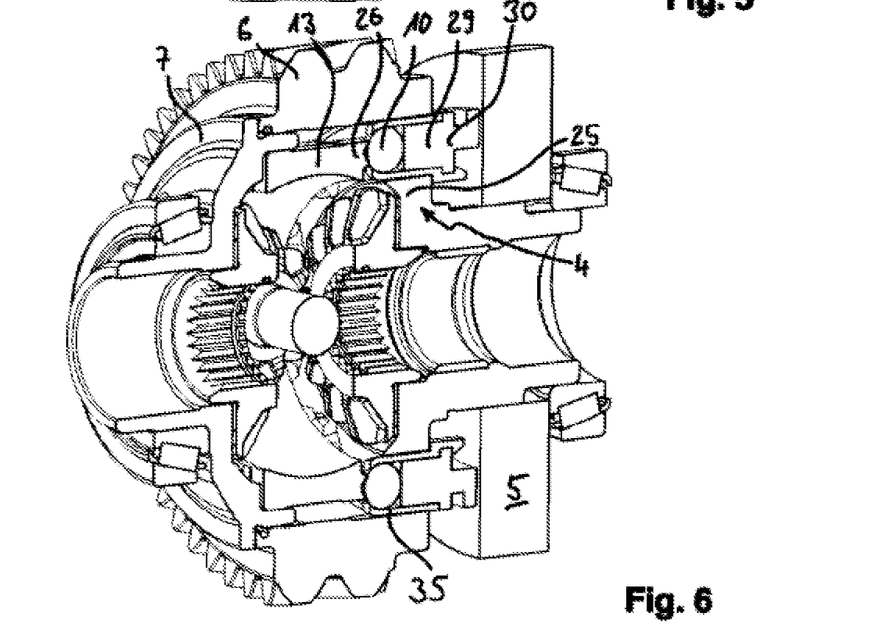
FIG. 6 is a perspective view of the differential arrangement according to FIG. 5.
Figure 7:
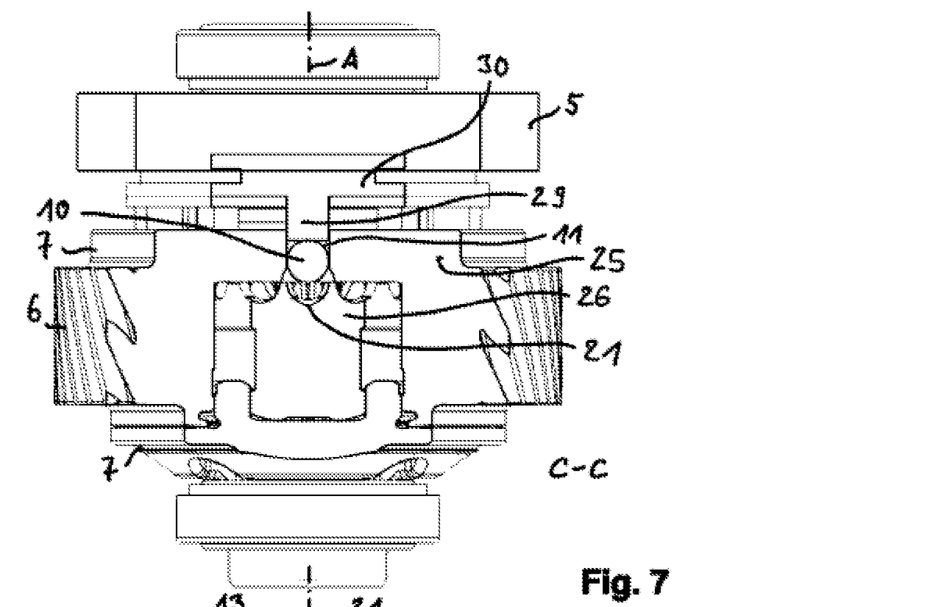
FIG. 7 is a detail of the differential arrangement according to FIG. 5 in longitudinal section.
Figure 8:
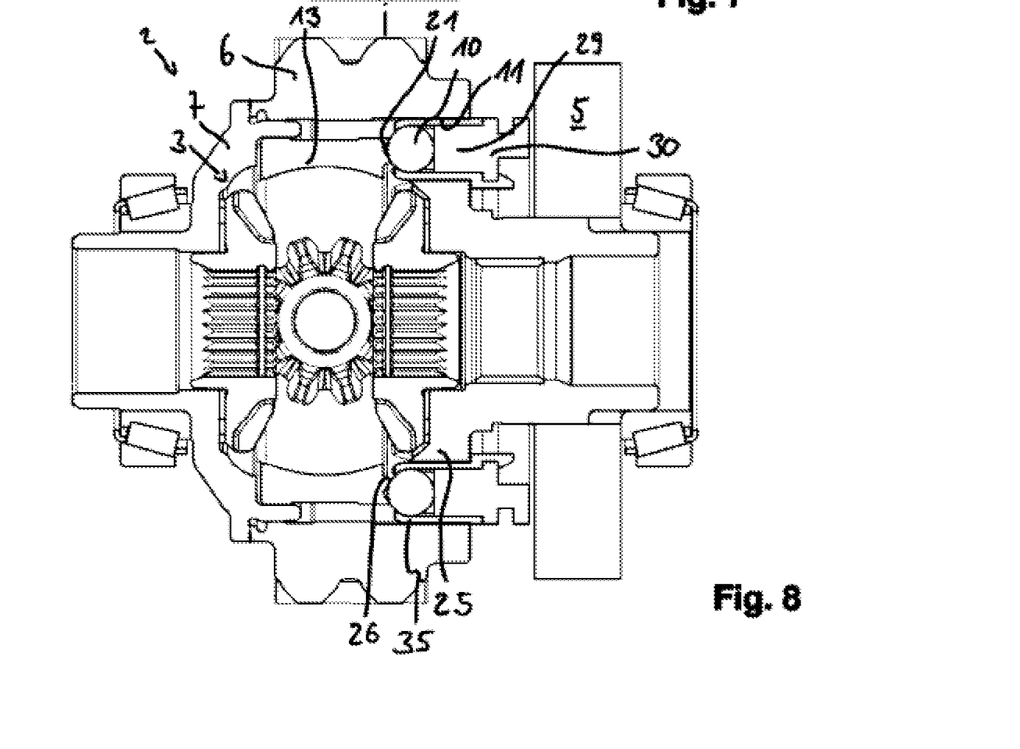
FIG. 8 shows the differential arrangement according to FIG. 5 with the shift clutch in the closed position.
Figure 9:
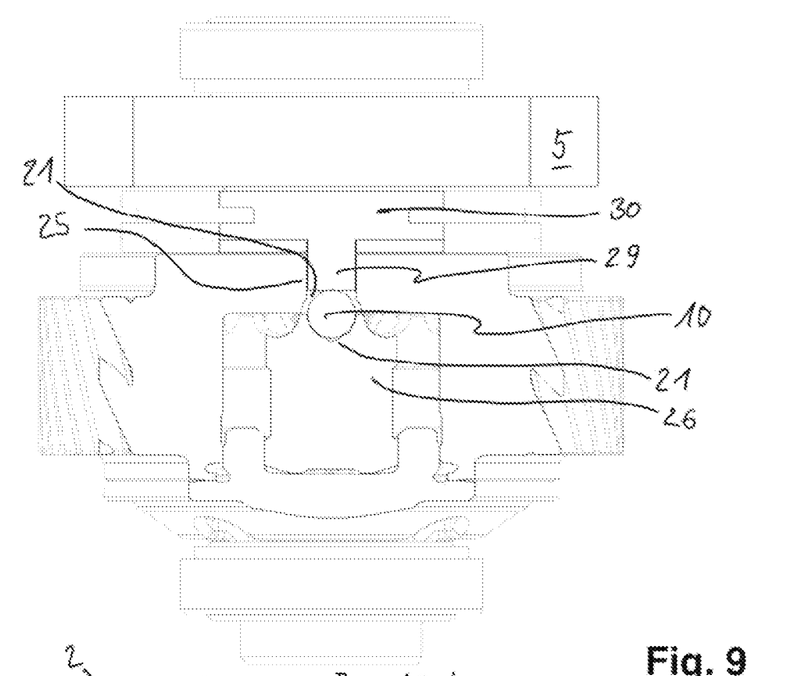
FIG. 9 is a detail according to FIG. 7 in a closed position of the clutch.

FIGS. 5 to 9 show a further embodiment of the differential arrangement 2. It largely corresponds to the embodiment according to FIGS. 1 to 4, so that reference is made to the above description with regard to the common features. In this context, identical or modified components are provided with the same reference numerals as in FIGS. 1 to 4. FIG. 5 shows the differential arrangement 2 with the shift clutch 4 in the open shifting position of the shift clutch. FIG. 6 shows a perspective view of the differential arrangement. FIG. 7 shows a detail of the differential arrangement in a longitudinal section along the line C-C in FIG. 5. FIG. 8 shows the differential arrangement 2 with the clutch 4 in the closed position and FIG. 9 shows the detail of the differential arrangement in a longitudinal section along the line C-C in FIG. 7. In the following, the differences are discussed with reference to FIGS. 5 to 9.

The special feature of the present embodiment is that the spherical coupling members 10 are guided axially displaceably in axial openings 11 of the first clutch part 25, the at least one switching element 12 having pins 29, which engage in the axial openings 11 and act on the coupling members 10. In FIGS. 6, 8 and 9 the shifting coupling 4 is shown in a closed state. The switching element 12 is in the first position, in which it holds the coupling members 10 in a torque-transmitting manner between the first clutch part 25 and the second clutch part 26. In FIGS. 5 and 7, the shift clutch 4 is shown in the open position. The switching element 12 is in the second position in which it releases the coupling members 10, so that the first clutch part 25 is disconnected from the second clutch part 26 and torque transmission is interrupted. In the closed state of the shift clutch 4, the switching element 12 in its first position actuates the coupling members 10 to protrude from the axial openings 11 so that the coupling members 10 engage in the recesses 21 of the second clutch part 26. In the open state of the shift clutch 4, the switching element 12 in its second position releases the coupling members to recoil from the recesses 21 into the openings 11. The switching element 12 is coaxially arranged with the second coupling member 26 and is displaceable in the axial direction between the first position and the second position.

In the closed state of the shift clutch 4, the coupling members 10 are held by the pins 29 in the recesses 21 of the second clutch part 26. The axial openings 11 of the first clutch part 25 are designed here as continuous axial bores in the differential housing 7. The switching element 12 has a ring section 30 acting on the pins 29 from outside the differential housing 7. The actuator 5 acts directly on the ring section 30 to actuate the switching element 12. The indicator element 38 may be arranged on the ring section 30, or the ring section itself may serve as the encoder element 38. Guide sleeves 35 are arranged in the axial openings 11 for guiding the coupling members 10.

Figure 10:
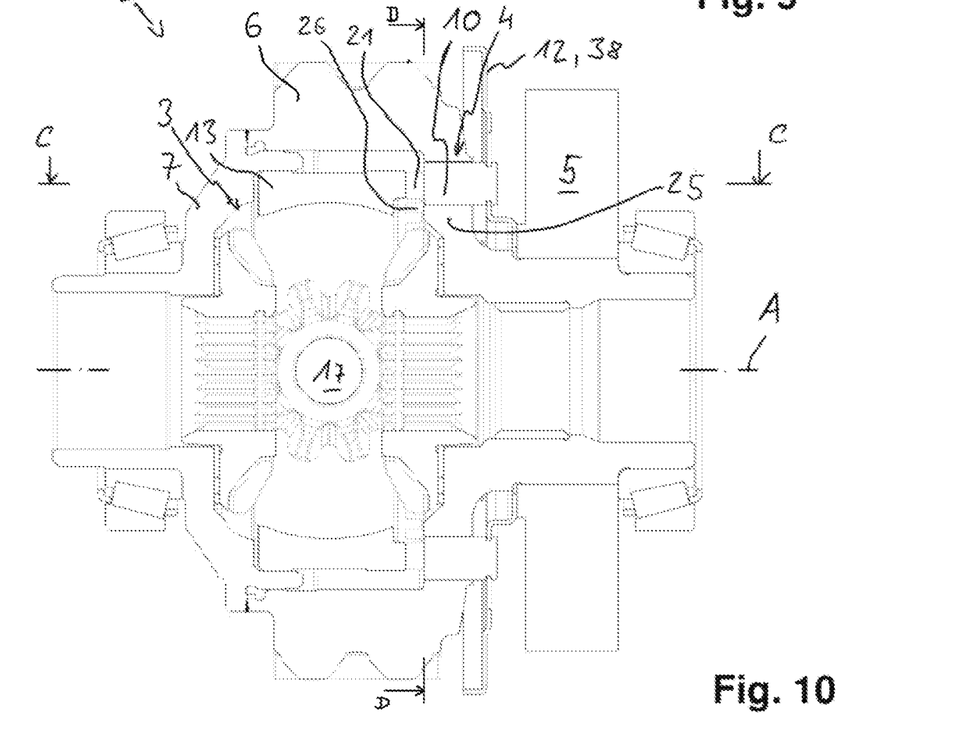
FIG. 10 shows a differential arrangement with shift clutch in a further embodiment in longitudinal section with the shift clutch in the open position.
Figure 11:
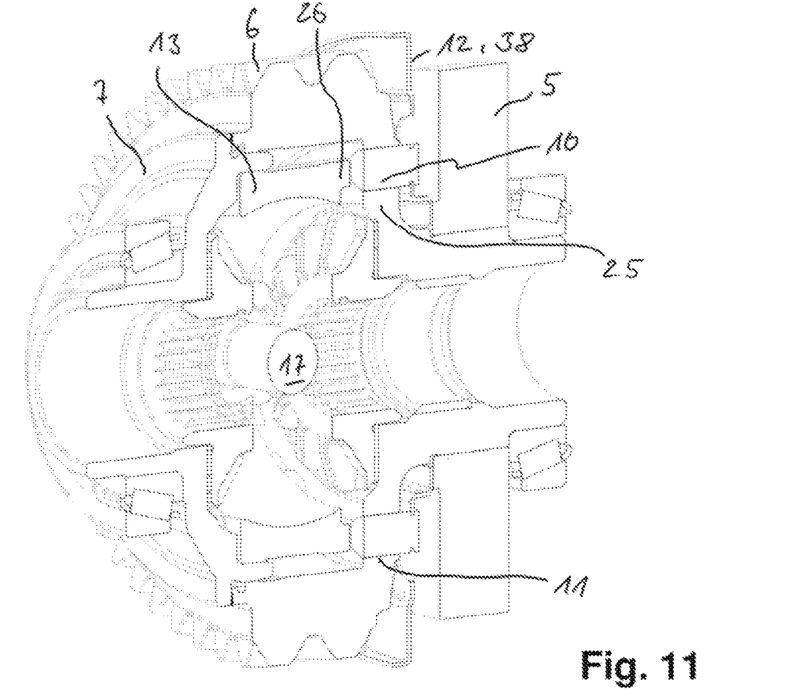
FIG. 11 is a perspective view of the differential arrangement according to FIG. 10.
Figure 12:
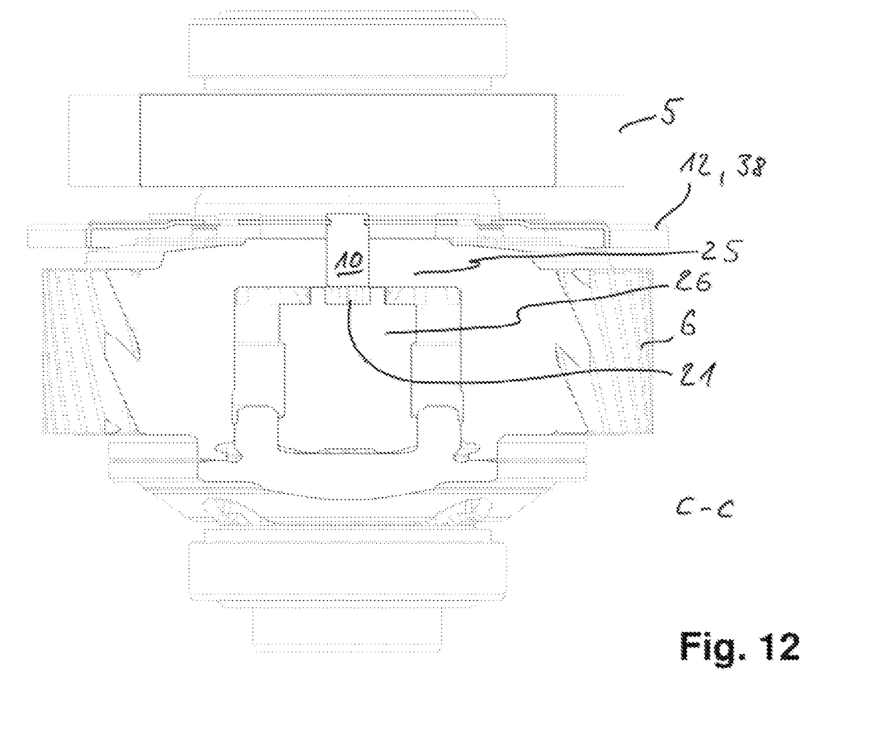
FIG. 12 is a detail of the differential arrangement according to FIG. 10 in longitudinal section.
Figure 13:
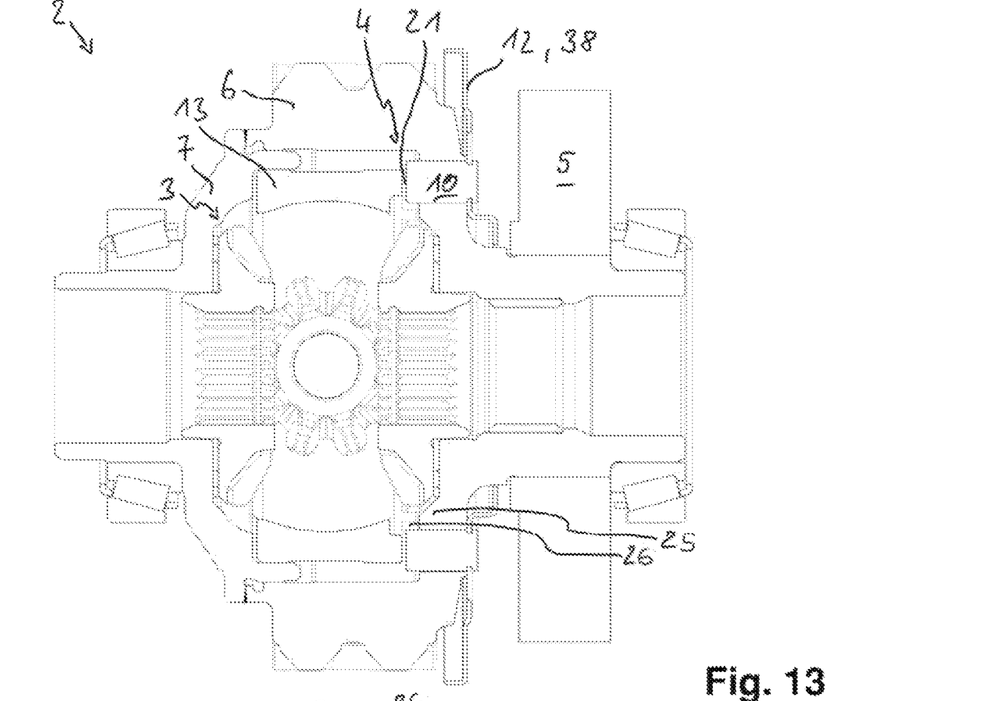
FIG. 13 shows the differential arrangement according to FIG. 10 with the shift clutch in the closed position.
Figure 14:
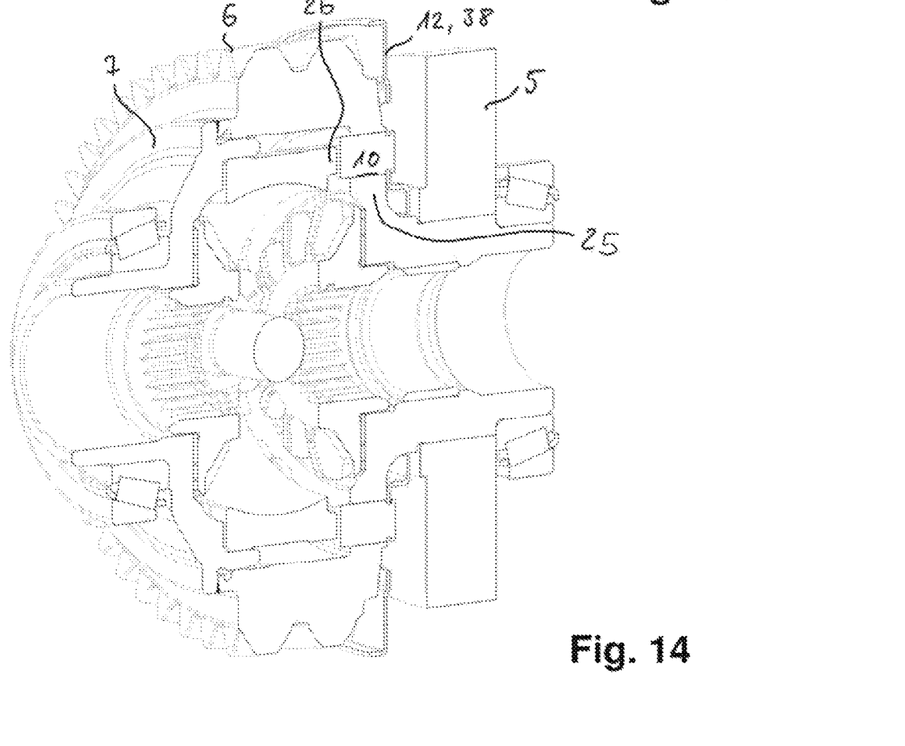
FIG. 14 is a perspective view of the differential arrangement according to FIG. 13.
Figure 15:
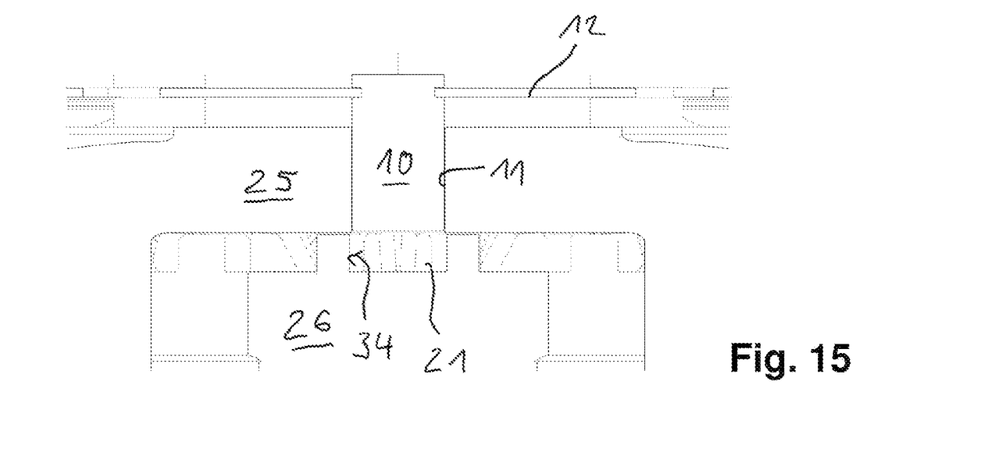
FIG. 15 is an enlarged view of the detail shown in FIG. 12.
Figure 16:
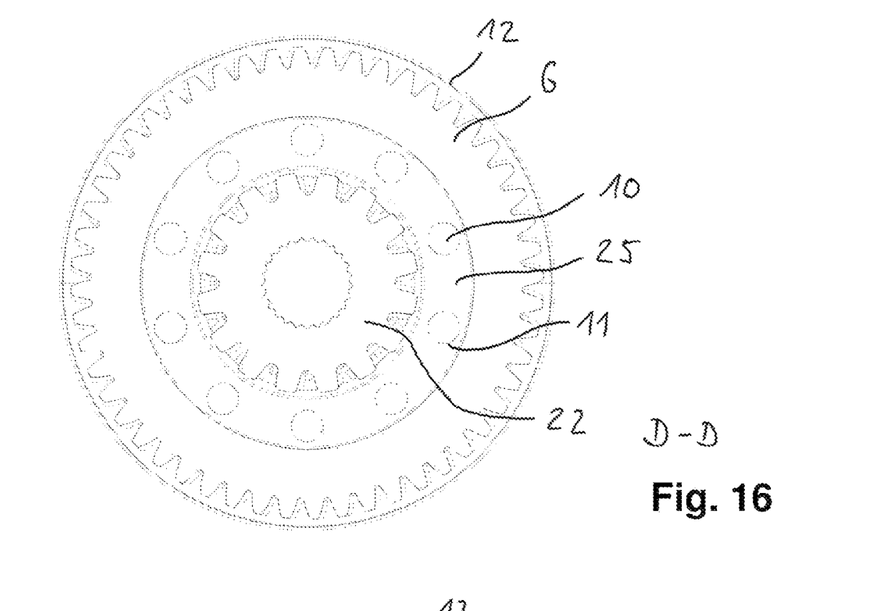
FIG. 16 shows the differential arrangement according to FIG. 10 in cross-section.
Figure 17:
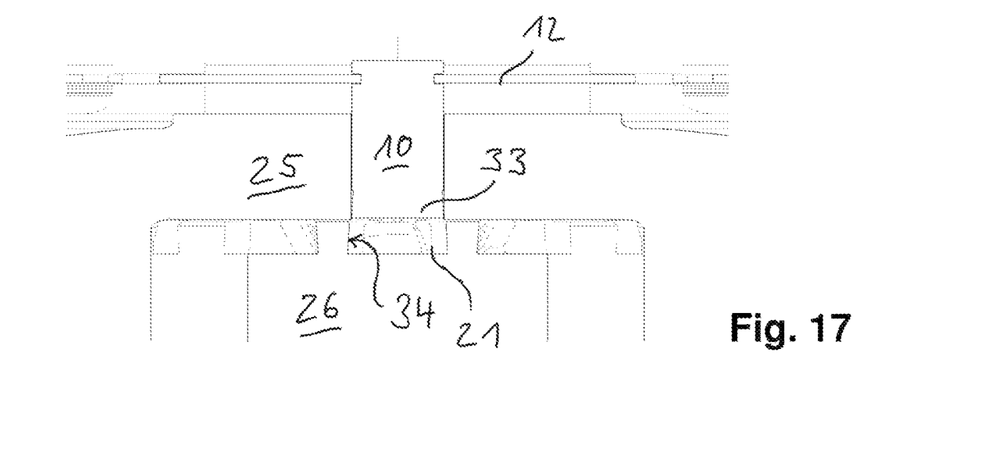
FIG. 17 is a detail of FIG. 15 according to an alternative embodiment.
Figure 18:
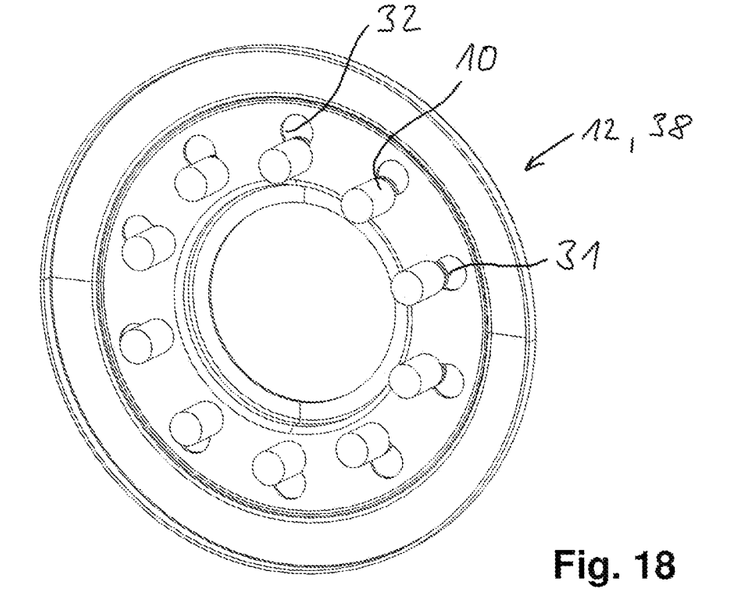
FIG. 18 is a detail of the differential arrangement according to FIG. 10 in perspective view.
Figure 19:
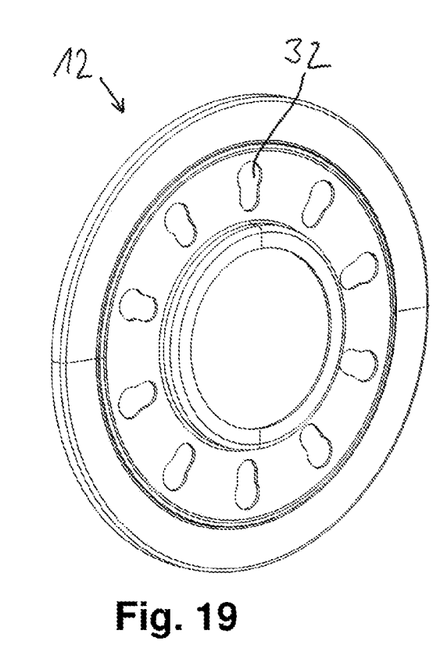
FIG. 19 is the detail according to FIG. 18 in a further perspective view.
Figure 20:
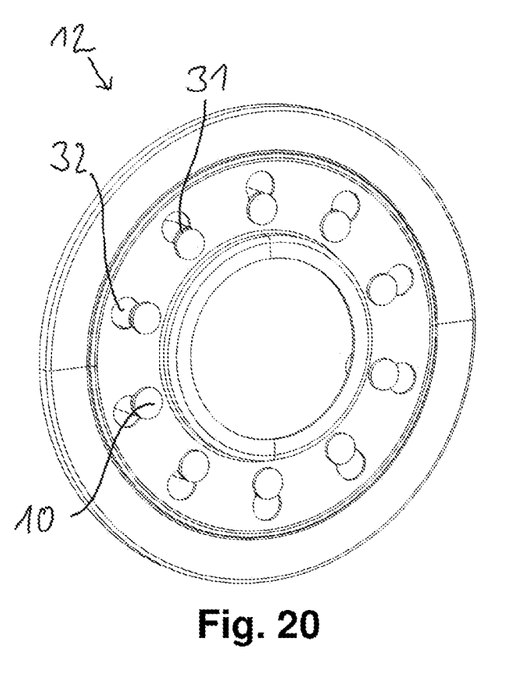
FIG. 20 is the detail according to FIG. 18 in a further perspective view.

FIGS. 10 to 20 show a further embodiment of the differential arrangement 2. It largely corresponds to the embodiment according to FIGS. 5 to 9, so that reference is made to the above description with regard to the common features. In this context, identical or modified components are provided with the same reference numerals as in FIGS. 1 to 9. The differences will be discussed below. FIG. 10 shows the differential arrangement 2 with the shift clutch 4 in longitudinal section with the shift clutch 4 in the open position. FIG. 11 shows a perspective view of the differential arrangement. FIG. 12 shows a detail of the differential arrangement 2 in a longitudinal section along the line C-C in FIG. 10. FIG. 13 shows the differential arrangement 2 in the closed shift position of the shift clutch 4. FIG. 14 shows the differential arrangement 2 in perspective view. FIG. 15 shows the detail of FIG. 12 in enlarged view, while FIG. 17 shows the detail in an alternative embodiment. FIG. 16 shows the differential arrangement 2 in a cross-section along the line D-D in FIG. 10. FIGS. 18 to 20 show a detail of the differential arrangement 2 in various views. In the following, the differences are discussed with reference to FIGS. 10 to 20.

In the exemplary embodiment, ten of the coupling members 10 are provided, which are axially slidably guided in axial openings 11 of the first clutch part 25. The particularity of the present embodiment lies in the fact that the coupling members 10 are designed as cylindrical pins, the coupling members 10 being fixedly connected to the switching element 12. A cylindrical pin is to be understood as a pin of substantially cylindrical shape, which may optionally comprise grooves or similar recesses in the longitudinal or circumferential direction.

In FIGS. 13 and 14, the shift clutch 4 is shown in the closed state. In the closed state of the shift clutch 4, the switching element 12 in its first position actuates the cylindrical coupling members 10 to protrude from the axial openings 11 so that the coupling members 10 engage in the recesses 21 of the second clutch part 26. In FIGS. 10 to 12, the shift clutch 4 is shown in an open state. In the opened state of the shift clutch 4, the switching element 12 in its second position actuates the pin-shaped coupling members 10 to recoil from the recesses 21 into the openings 11. The switching element 12 is coaxially arranged with the second coupling member 26 and is displaceable in the axial direction between the first position and the second position.

FIG. 12 shows a section along the line C-C as shown in FIG. 10. The switching element 12 is shown in detail in the second position, i.e. in the disconnected state of the shift clutch 4. One of the coupling members 10 can be seen to have recoiled from one of the recesses 21 into one of the openings 11. In FIG. 15, the detail is shown enlarged. In FIG. 16, a section along the line D-D according to FIG. 10 is shown. A diameter of the cylindrical coupling member 10 fits into the recess 21 bounded by walls 34, which is formed as an elongate hole in the circumferential direction to facilitate displacement of the coupling member 10 into the second position. The coupling members 10 have a clearance fit to the recess 21 in the second clutch part 26. The play is, for example, between 0.02 and 0.06 millimeter in the radial direction. In the circumferential direction, the play of the elongated hole of the recess 21 is 0.6 to 0.8 millimeter greater than in the radial direction. In the illustrated embodiment, the recess 21 is not formed as a complete bore in a solid material of the second coupling member 26, but is formed on an annular stub of the differential carrier 13, the radial extension of which is smaller than the bore diameter. A play between the coupling members 10 and the first clutch part 25 compensates for positional tolerances of the coupling geometry on the differential carrier 13 and a deformation of the differential carrier 13 and the coupling members 10 under load. For example, it may be between 0.08 and 0.3 millimeter.

FIG. 17 shows the detail according to an alternative embodiment. The cylindrical coupling member 10 comprises a head portion 33 facing the second clutch part 26, which engages in the recess 21 when the shift clutch 4 is in the closed state. This head portion 33 has a conical shape, the head portion 33 tapering in the axial direction from the second clutch part 26 towards the first clutch part 25. The recess 21 has a shape approximately complementary to that of the coupling member 10. The recess 21 widens in the axial direction from the first clutch part 25 towards the second clutch part 26. Due to this shape, the coupling member 10 is held in the recess 21 by friction between the head region 33 of the coupling member 10 and the wall 34 of the recess 21 even at very low acting torques.

In FIG. 19, the switching element 12 or the indicator element 38 is shown without coupling elements. In FIGS. 18 and 20, the switching element 12 of the embodiment according to FIG. 10 is shown as a detail in perspective view. The cylindrical coupling members 10 are positively connected to the switching element 12 in the axial direction, for example by a circumferential groove 31 on the coupling members 10 being inserted into corresponding keyhole-shaped opening 32 on the annular disc-shaped switching element 12. A play between the coupling members 10 and the switching element 12 may be, for example, 0.2 millimeter, since there is generally no transmission of force between the coupling members 10 and the switching element 12. Alternatively, the coupling members 10 may be attached to the annular disc-shaped switching element 12 in a suitable different manner, for example by a screw connection, by gluing or by spot welding. In the embodiment, the switching element 12 may serve as an indicator element 29 for the sensor 44 for determining the switching positions of the shift clutch. Since there is essentially no transmission of force between the coupling members 10 and the switching element 12, the switching element 12 may have a low torsional stiffness, for example less than 20 percent of the torsional stiffness of the first coupling member 25 and the second coupling member 26, in particular less than ten percent.

Figure 21:
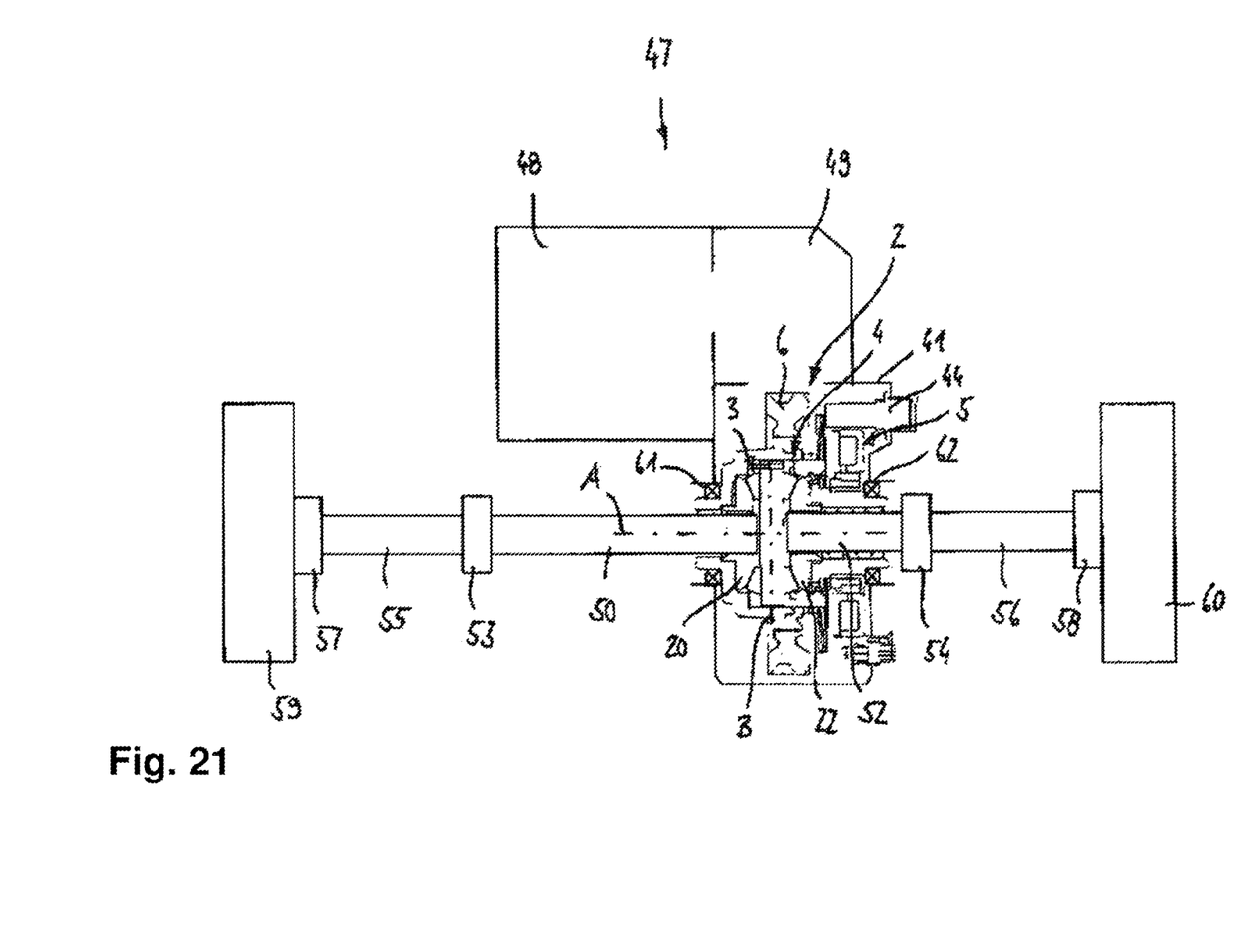
FIG. 21 is a schematic representation of a drive arrangement with the differential arrangement.

FIG. 21 shows a drive arrangement 47 with the differential arrangement 2 in schematic representation. The drive arrangement 47 comprises a drive motor 48 which drives the differential arrangement 2, or the drive wheel 6 of the differential arrangement 2, via a gear stage 49. From the differential gear 3, the torque is transmitted to the two side shaft gears 20, 22 when the shift clutch 4 is closed. Corresponding side shafts 50, 52 are inserted in a rotationally fixed manner in the longitudinal toothings 23 of the side shaft wheels 20, 22 for torque transmission. At the ends of the side shafts 50, 52 there are constant velocity swivel joints 53, 54, which in turn are connected to wheels 59, 60 of the motor vehicle via cardan shafts 55, 56 and joints 57, 58 for transmitting a torque. It can be seen that the differential arrangement 2 is mounted by means of bearings 61, 62 so as to be rotatable relative to the stationary housing 41 about the axis of rotation A.

LIST OF REFERENCE SIGNS

2 Differential arrangement
3 Differential gear
4 Shift clutch
5 Actuator
6 Drive wheel
7 Differential housing
8 First housing
9 Second housing
10 Coupling members
11 Openings
12 Switching element
13 Differential carrier
14 Outer surface
15 Surface portion
17 Journal
19 Differential pinions
20 Sideshaft gear
21 Recesses
22 Sideshaft gear
23 Longitudinal toothing
25 First clutch part
26 Second clutch part
27 Projection
28 Apertures
29 Pin
30 Ring section
31 Circumferential groove
32 Keyhole shaped opening
33 Head portion
34 Wall
35 Guide sleeves
38 Indicator element
43 Return spring
44 Sensor
45 Shift contour
47 Drive arrangement
48 Motor
49 Gearbox
50, 52 Sideshafts
53, 54 Joints
55, 56 Cardan shafts
59, 60 Wheels
61, 62 Bearings
A Rotation axis
B Journal axis

The invention claimed is:

1. A differential arrangement for a drive axle of a motor vehicle, the differential arrangement comprising:
   a drive wheel;
   a differential gear with an input part;
   a shift clutch operatively arranged between the drive wheel and the differential gear, wherein in a closed state of the shift clutch a torque is transmitted from the drive wheel to the differential gear, and in an open state of the shift clutch the torque transmission is disconnected;
   wherein a first clutch part of the shift clutch is fixedly connected to a differential housing of the differential gear and a second clutch part of the shift clutch is fixedly connected to the input part;
   wherein the shift clutch comprises coupling members which are displaceably arranged relative to the first clutch part and to the second clutch part, and at least one switching element which acts on the coupling members;
   wherein the switching element displaces the coupling members between a first position for the closed state of the shift clutch in which the coupling members are arranged in a torque-transmitting manner between the first clutch part and the second clutch part, and a second position for the open state of the shift clutch, in which the first clutch part is separated from the second clutch part;
   wherein at least six coupling members are provided;
   wherein the coupling members are guided in openings of one of the first clutch part and the second clutch part,
   wherein, in the closed state of the shift clutch, the switching element, in the first position, actuates the coupling members to emerge from the openings so that the coupling members engage in recesses of the respective other one of the first clutch part and the second clutch part, and
   wherein, in the open state of the shift clutch, the switching element, in the second position, actuates the coupling members to recoil from the recesses into the openings.

2. The differential arrangement according to claim 1, wherein the coupling members are formed as balls or as cylindrical pins, wherein the balls or the cylindrical pins have a diameter between five and fifteen millimeters.

3. The differential arrangement according to claim 1, wherein the coupling members guided in openings of one of the first clutch part and the second clutch part are guided in openings of the first clutch part, said openings of the first clutch part being axial openings and the coupling members being axially displaceably guided in said axial openings.

4. The differential arrangement according to claim 3, wherein the axial openings of the first clutch part are formed as continuous axial bores of the differential housing.

5. The differential arrangement according to claim 3, wherein the coupling members are formed as cylindrical pins, the coupling members being fixedly connected to the switching element.

6. The differential arrangement according to claim 5, wherein said coupling members comprise a conical head portion facing said second clutch part, said head portion tapering in an axial direction from said second clutch part towards said first clutch part.

7. The differential arrangement according to claim 5, wherein the recesses of the second clutch part widen in an axial direction from a surface facing the first clutch part into the second clutch part.

8. The differential arrangement according to claim 3, wherein the recesses of the second clutch part are formed as elongated holes extending in a circumferential direction.

9. The differential arrangement according to claim 3, wherein the coupling members are positively connected to the switching element in an axial direction.

10. The differential arrangement according to claim 3, wherein the switching element serves as an indicator element for a sensor for determining shift positions of the shift clutch.

11. The differential arrangement according to claim 3, wherein the at least one switching element has pins protruding into the axial openings, wherein the coupling members, formed as balls, are held, in the closed state of the shift coupling, in the recesses of the second clutch part by the pins.

12. The differential arrangement according to claim 11, wherein guide sleeves for guiding the coupling members are arranged in the axial openings.

13. The differential arrangement according to claim 1, wherein the coupling members guided in openings of one of the first clutch part and the second clutch part are guided in openings of the second clutch part, said openings of the second clutch part being radial openings and the coupling members being radially displaceably guided in said radial openings, the radial openings being formed as continuous radial bores of the input part, wherein the at least one switching element has a switching contour acting on the coupling members, and wherein, in the closed state of the shift clutch, the coupling members are locked in a radial direction by the at least one switching element.

14. The differential arrangement according to claim 13, wherein the at least one switching element has at least one projection extending axially through at least one aperture of the differential housing, the switching element being actuated by an actuator via the at least one projection, the at least one projection being connected to an indicator element for a sensor for determining switching positions of the shift clutch.

15. The differential arrangement according to claim 1, wherein the number of coupling members is between eight and sixteen.

16. A differential arrangement for a drive axle of a motor vehicle, the differential arrangement comprising:
   a drive wheel;
   a differential gear with an input part;
   a shift clutch operatively arranged between the drive wheel and the differential gear, wherein in a closed state of the shift clutch a torque is transmitted from the drive wheel to the differential gear, and in an open state of the shift clutch the torque transmission is disconnected;
   wherein a first clutch part of the shift clutch is fixedly connected to a differential housing of the differential gear and a second clutch part of the shift clutch is fixedly connected to the input part;
   wherein the shift clutch comprises coupling members displaceably arranged relative to the first clutch part and to the second clutch part, and at least one switching element which acts on the coupling members;
   wherein the switching element displaces the coupling members between a first position for the closed state of the shift clutch in which the coupling members are arranged in a torque-transmitting manner between the first clutch part and the second clutch part, and a second position for the open state of the shift clutch, in which the first clutch part is separated from the second clutch part, wherein at least six coupling members are provided;

wherein the coupling members are guided axially displaceable in axial openings of the first clutch part; and wherein the coupling members are formed as cylindrical pins, the coupling members being fixedly connected to the switching element.

17. The differential arrangement according to claim 16, wherein said coupling members comprise a conical head portion facing said second clutch part, said head portion tapering in an axial direction from said second clutch part towards said first clutch part;

and wherein the recesses of the second clutch part widen in the axial direction from a surface facing the first clutch part into the second clutch part.

18. The differential arrangement according to claim 16, wherein the recesses of the second clutch part are formed as elongated holes extending in a circumferential direction.

19. A differential arrangement for a drive axle of a motor vehicle, the differential arrangement comprising:

a drive wheel;

a differential gear with an input part;

a shift clutch operatively arranged between the drive wheel and the differential gear, wherein in a closed state of the shift clutch a torque is transmitted from the drive wheel to the differential gear, and in an open state of the shift clutch the torque transmission is disconnected;

wherein a first clutch part of the shift clutch is fixedly connected to a differential housing of the differential gear and a second clutch part of the shift clutch is fixedly connected to the input part;

wherein the shift clutch comprises coupling members which are displaceably arranged relative to the first clutch part and to the second clutch part, and at least one switching element which acts on the coupling members;

wherein the switching element displaces the coupling members between a first position for the closed state of the shift clutch in which the coupling members are arranged in a torque-transmitting manner between the first clutch part and the second clutch part, and a second position for the open state of the shift clutch, in which the first clutch part is separated from the second clutch part;

wherein at least six coupling members are provided;

wherein the coupling members are guided axially displaceably in axial openings of the first clutch part; and wherein the at least one switching element has pins protruding into the axial openings, wherein the coupling members, formed as balls, are held, in the closed state of the shift coupling, in recesses of the second clutch part by the pins.

20. The differential arrangement according to claim 19, wherein guide sleeves for guiding the coupling members are arranged in the axial openings.

* * * * *